(12) United States Patent
Lavoie et al.

(10) Patent No.: US 11,124,235 B2
(45) Date of Patent: Sep. 21, 2021

(54) SPEED OPTIMIZED TRAJECTORY CONTROL FOR MOTOR VEHICLES

(71) Applicant: Ford Global Technologies, LLC, Dearborn, MI (US)

(72) Inventors: Erick Michael Lavoie, Dearborn, MI (US); Nathaniel A Rolfes, Detroit, MI (US); Bradley G. Hochrein, Dexter, MI (US); Darrel Alan Recker, Ypsilanti, MI (US); Donald Jacob Mattern, Canton, MI (US); Michael Hafner, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 16/354,366

(22) Filed: Mar. 15, 2019

(65) Prior Publication Data

US 2019/0210648 A1    Jul. 11, 2019

Related U.S. Application Data (62) Division of application No. 14/618,368, filed on Feb. 10, 2015, now Pat. No. 10,286,950.

(51) Int. Cl.
*B62D 13/06* (2006.01)
*B62D 15/02* (2006.01)

(52) U.S. Cl.
CPC ........... *B62D 13/06* (2013.01); *B62D 15/027* (2013.01)

(58) Field of Classification Search
CPC .............................. B62D 13/06; B62D 15/027
See application file for complete search history.

(56) References Cited

U.S. PATENT DOCUMENTS

| 3,542,390 A | 11/1970 | Fikse |
| 3,756,624 A | 9/1973 | Taylor |
| 3,860,257 A | 1/1975 | Mesly |

(Continued)

FOREIGN PATENT DOCUMENTS

| CN | 202159367 U | 3/2012 |
| DE | 3931518 A1 | 4/1991 |

(Continued)

OTHER PUBLICATIONS

Haviland, G S, "Automatic Brake Control for Trucks—What Good Is It?", TRID, Society of Automotive Engineers, Sep. 1968, 1 pg.

(Continued)

*Primary Examiner* — Jess Whittington
(74) *Attorney, Agent, or Firm* — Raymond Coppiellie; Price Heneveld LLP (57) ABSTRACT

A trailer backup assist system for motor vehicles includes an auxiliary user input feature that can be used by a vehicle operator to provide a steering curvature command corresponding to a desired vehicle path curvature without requiring a user to move a steering wheel of the motor vehicle. The trailer backup assist system is configured to control a vehicle speed while the vehicle is backing up with a trailer attached thereto utilizing an input comprising at least one of a steering curvature command and an angle of a trailer relative to the vehicle. The trailer backup assist system controls at least one of a brake system, an engine torque, and a transmission gear selection to thereby control vehicle speed in a reverse direction.

14 Claims, 4 Drawing Sheets

(56) References Cited

U.S. PATENT DOCUMENTS

| | | | |
|---|---|---|---|
| 4,042,132 A | 8/1977 | Bohman et al. | |
| 4,735,432 A | 4/1988 | Brown | |
| 4,752,080 A | 6/1988 | Rogers | |
| 4,754,828 A * | 7/1988 | Morishita | B62D 5/0478 |
| | | | 180/446 |
| 4,848,499 A | 7/1989 | Martinet et al. | |
| 5,001,639 A | 3/1991 | Breen | |
| 5,108,158 A | 4/1992 | Breen | |
| 5,246,242 A | 9/1993 | Penzotti | |
| 5,247,442 A | 9/1993 | Kendall | |
| 5,558,350 A | 9/1996 | Kimbrough et al. | |
| 5,586,814 A | 12/1996 | Steiner | |
| 6,042,196 A | 3/2000 | Nakamura et al. | |
| 6,056,371 A | 5/2000 | Lin et al. | |
| 6,292,094 B1 | 9/2001 | Deng et al. | |
| 6,351,698 B1 | 2/2002 | Kubota et al. | |
| 6,409,288 B2 | 6/2002 | Yoshida et al. | |
| 6,494,476 B2 | 12/2002 | Masters et al. | |
| 6,498,977 B2 | 12/2002 | Wetzel et al. | |
| 6,567,731 B2 | 5/2003 | Chandy | |
| 6,838,979 B2 | 1/2005 | Deng et al. | |
| 6,854,557 B1 | 2/2005 | Deng et al. | |
| 7,032,705 B2 | 4/2006 | Zheng et al. | |
| 7,117,077 B2 | 10/2006 | Michi et al. | |
| 7,136,754 B2 | 11/2006 | Hahn et al. | |
| 7,139,650 B2 | 11/2006 | Lubischer | |
| 7,154,385 B2 | 12/2006 | Lee et al. | |
| 7,165,820 B2 | 1/2007 | Rudd, III | |
| 7,219,913 B2 | 5/2007 | Atley | |
| 7,319,927 B1 | 1/2008 | Sun et al. | |
| 7,690,737 B2 | 4/2010 | Lu | |
| 7,796,944 B2 | 4/2010 | Tanaka et al. | |
| 7,715,953 B2 | 5/2010 | Shepard | |
| 7,793,965 B2 | 9/2010 | Padula | |
| 7,969,326 B2 | 6/2011 | Sakakibara | |
| 8,010,253 B2 | 8/2011 | Lundquist | |
| 8,027,773 B2 * | 9/2011 | Ahn | B60W 10/18 |
| | | | 701/70 |
| 8,033,955 B2 | 10/2011 | Farnsworth | |
| 8,036,792 B2 | 10/2011 | Dechamp | |
| 8,108,116 B2 | 1/2012 | Mori et al. | |
| 8,170,726 B2 | 5/2012 | Chen et al. | |
| 8,244,442 B2 | 8/2012 | Craig et al. | |
| 8,260,518 B2 | 9/2012 | Englert | |
| 8,267,485 B2 | 9/2012 | Barlsen et al. | |
| 8,280,607 B2 | 10/2012 | Gatti et al. | |
| 8,374,749 B2 | 2/2013 | Tanaka | |
| 8,430,792 B2 | 4/2013 | Noll | |
| 8,469,125 B2 | 6/2013 | Yu et al. | |
| 8,571,758 B2 | 10/2013 | Klier et al. | |
| 8,755,982 B2 | 6/2014 | Heckel et al. | |
| 8,755,984 B2 | 6/2014 | Rupp et al. | |
| 8,798,860 B2 | 8/2014 | Dechamp | |
| 8,825,328 B2 | 9/2014 | Rupp et al. | |
| 8,909,426 B2 | 12/2014 | Rhode et al. | |
| 8,930,140 B2 | 1/2015 | Trombley et al. | |
| 9,047,778 B1 * | 6/2015 | Cazanas | G08G 1/166 |
| 9,102,271 B2 | 8/2015 | Trombley et al. | |
| 9,108,598 B2 | 8/2015 | Headley | |
| 9,132,856 B2 | 9/2015 | Shepard | |
| 9,156,496 B2 | 10/2015 | Greenwood et al. | |
| 9,164,955 B2 | 10/2015 | Lavoie et al. | |
| 9,180,890 B2 | 11/2015 | Lu et al. | |
| 9,227,474 B2 | 1/2016 | Liu | |
| 9,229,453 B1 | 1/2016 | Lee | |
| 9,238,483 B2 | 1/2016 | Hafner et al. | |
| 9,248,858 B2 | 2/2016 | Lavoie et al. | |
| 9,290,202 B2 | 3/2016 | Lavoie | |
| 9,315,212 B1 | 4/2016 | Kyrtsos et al. | |
| 9,340,228 B2 | 4/2016 | Ku et al. | |
| 9,335,162 B2 | 5/2016 | Kyrtsos et al. | |
| 9,346,396 B2 | 5/2016 | Nave et al. | |
| 9,374,562 B2 | 6/2016 | Trombley et al. | |
| 9,493,187 B2 | 11/2016 | Pilutti et al. | |
| 9,500,497 B2 | 11/2016 | Lavoie et al. | |
| 9,513,103 B2 | 12/2016 | Crossman | |
| 2001/0037164 A1 | 11/2001 | Hecker | |
| 2001/0052434 A1 | 12/2001 | Ehrlich et al. | |
| 2004/0143416 A1 * | 7/2004 | Hattori | B60T 8/172 |
| | | | 702/157 |
| 2004/0222881 A1 | 11/2004 | Deng | |
| 2005/0206224 A1 | 9/2005 | Lu | |
| 2005/0206225 A1 | 9/2005 | Offerle et al. | |
| 2005/0206229 A1 | 9/2005 | Lu et al. | |
| 2005/0236201 A1 | 10/2005 | Spannheimer et al. | |
| 2005/0236896 A1 | 10/2005 | Offerle et al. | |
| 2006/0103511 A1 | 5/2006 | Lee et al. | |
| 2006/0142936 A1 | 6/2006 | Dix | |
| 2006/0229782 A1 * | 10/2006 | Deng | B62D 6/003 |
| | | | 701/42 |
| 2006/0235589 A1 * | 10/2006 | Deng | B62D 13/00 |
| | | | 701/41 |
| 2007/0027581 A1 | 2/2007 | Bauer et al. | |
| 2007/0198190 A1 | 8/2007 | Bauer et al. | |
| 2008/0177443 A1 | 7/2008 | Lee et al. | |
| 2008/0231701 A1 | 9/2008 | Greenwood et al. | |
| 2009/0082935 A1 | 3/2009 | Leschuk et al. | |
| 2009/0157260 A1 | 6/2009 | Lee | |
| 2009/0198425 A1 | 8/2009 | Englert | |
| 2009/0271078 A1 | 10/2009 | Dickinson | |
| 2009/0306854 A1 | 12/2009 | Dechamp | |
| 2009/0306861 A1 | 12/2009 | Schumann et al. | |
| 2009/0326775 A1 | 12/2009 | Nishida | |
| 2010/0063702 A1 * | 3/2010 | Sabelstrom | B60T 7/20 |
| | | | 701/70 |
| 2010/0152989 A1 | 6/2010 | Smith et al. | |
| 2011/0087398 A1 | 4/2011 | Lu et al. | |
| 2012/0041658 A1 | 2/2012 | Turner | |
| 2012/0095649 A1 | 4/2012 | Klier et al. | |
| 2012/0123642 A1 * | 5/2012 | Kojo | B62D 15/025 |
| | | | 701/41 |
| 2012/0200706 A1 | 8/2012 | Greenwood et al. | |
| 2012/0271512 A1 | 10/2012 | Rupp et al. | |
| 2012/0271514 A1 | 10/2012 | Lavoie et al. | |
| 2012/0271515 A1 | 10/2012 | Rhode et al. | |
| 2012/0271522 A1 | 10/2012 | Rupp et al. | |
| 2012/0283909 A1 | 11/2012 | Dix | |
| 2012/0310594 A1 | 12/2012 | Watanabe | |
| 2012/0316732 A1 | 12/2012 | Auer | |
| 2012/0323473 A1 * | 12/2012 | Irie | B60W 30/12 |
| | | | 701/117 |
| 2013/0148748 A1 | 6/2013 | Suda | |
| 2013/0179038 A1 | 7/2013 | Goswami et al. | |
| 2013/0268160 A1 | 10/2013 | Trombley et al. | |
| 2014/0052337 A1 * | 2/2014 | Lavoie | B62D 15/027 |
| | | | 701/41 |
| 2014/0058614 A1 | 2/2014 | Trombley et al. | |
| 2014/0058622 A1 | 2/2014 | Trombley et al. | |
| 2014/0058655 A1 | 2/2014 | Trombley et al. | |
| 2014/0058668 A1 | 2/2014 | Trombley et al. | |
| 2014/0067154 A1 | 3/2014 | Yu et al. | |
| 2014/0067155 A1 | 3/2014 | Yu et al. | |
| 2014/0085472 A1 | 3/2014 | Lu et al. | |
| 2014/0121930 A1 | 5/2014 | Allexi et al. | |
| 2014/0133170 A1 | 5/2014 | Nave et al. | |
| 2014/0142798 A1 * | 5/2014 | Guarnizo Martinez | G08G 1/16 |
| | | | 701/23 |
| 2014/0160276 A1 | 6/2014 | Pliefke et al. | |
| 2014/0172232 A1 | 6/2014 | Rupp et al. | |
| 2014/0188344 A1 | 7/2014 | Lavoie | |
| 2014/0188346 A1 | 7/2014 | Lavoie | |
| 2014/0210456 A1 | 7/2014 | Crossman | |
| 2014/0218506 A1 | 8/2014 | Trombley et al. | |
| 2014/0218522 A1 | 8/2014 | Lavoie et al. | |
| 2014/0222288 A1 | 8/2014 | Lavoie et al. | |
| 2014/0236532 A1 | 8/2014 | Trombley et al. | |
| 2014/0249691 A1 | 9/2014 | Hafner et al. | |
| 2014/0249723 A1 | 9/2014 | Pilutti et al. | |
| 2014/0267688 A1 | 9/2014 | Aich et al. | |
| 2014/0267689 A1 | 9/2014 | Lavoie | |
| 2014/0267868 A1 | 9/2014 | Mazzola et al. | |
| 2014/0267869 A1 | 9/2014 | Sawa | |
| 2014/0277942 A1 | 9/2014 | Kyrtsos et al. | |

(56) References Cited

U.S. PATENT DOCUMENTS

| | | |
|---|---|---|
| 2014/0288769 A1 | 9/2014 | Trombley et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343793 A1 | 11/2014 | Lavoie et al. |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2015/0217693 A1* | 8/2015 | Pliefke .................. B62D 13/06 348/118 |
| 2015/0232092 A1 | 8/2015 | Fairgrieve et al. |
| 2015/0298738 A1* | 10/2015 | Hoel ...................... B62D 13/06 701/41 |
| 2016/0001705 A1 | 1/2016 | Greenwood et al. |
| 2016/0009288 A1 | 1/2016 | Yu |
| 2016/0039456 A1 | 2/2016 | Lavoie et al. |
| 2016/0052548 A1 | 2/2016 | Singh et al. |
| 2016/0059888 A1 | 3/2016 | Bradley et al. |
| 2016/0229452 A1 | 8/2016 | Lavoie et al. |

FOREIGN PATENT DOCUMENTS

| | | |
|---|---|---|
| DE | 9208595 U1 | 8/1992 |
| DE | 10154612 A1 | 5/2003 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102007029413 A1 | 1/2009 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102010029184 A1 | 11/2011 |
| EP | 0418653 A1 | 3/1991 |
| EP | 1361543 A2 | 11/2003 |
| EP | 1655191 A1 | 5/2006 |
| EP | 1810913 A1 | 7/2007 |
| EP | 2388180 A2 | 11/2011 |
| EP | 2644477 A1 | 10/2013 |
| FR | 2515379 A1 | 4/1983 |
| JP | 09267762 A | 10/1997 |
| JP | 10119739 A | 5/1998 |
| JP | 2012166580 A | 9/2012 |
| WO | 0044605 A1 | 8/2000 |
| WO | 2012059207 A1 | 5/2012 |
| WO | 2012103193 A1 | 8/2012 |
| WO | 2013186208 A2 | 12/2013 |
| WO | 2015187467 A1 | 12/2015 |

OTHER PUBLICATIONS

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.

Olaudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

Divelbiss, A.W.; Wen, J.T.; "Trajectory Tracking Control of a Car-Trailer System", IEEE, Control Systems Technology, Aug. 6, 2002, vol. 5, No. 3, 1 pg.

Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.

"Understanding Tractor-Trailer Performance", Caterpillar, 2006, pp. 1-28.

C. Lundquist; W. Reinelt; O. Enqvist, "Back Driving Assistant for Passenger Cars with Trailer", ZF Lenksysteme GmbH, Schwabisch Gmünd, Germany, 2006 (SAE Int'l) Jan. 2006, pp. 1-8.

Olof Enqvist, "AFS-Assisted Trailer Reversing," Institutionen for systemteknik Deartment of Electrical Engineering, Jan. 27, 2006, 57 pgs.

Cedric Pradalier, Kane Usher, "Robust Trajectory Tracking for a Reversing Tractor-Trailer System", (Draft), Field and Service Robotics Conference, CSIRO ICT Centre, Jul. 2007, 16 pages.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.

Cedric Pradalier, Kane Usher, "Experiments in Autonomous Reversing of a Tractor-Trailer System", 6th International Conference on Field and Service Robotics, inria-00195700, Version 1, Dec. 2007, 10 pgs.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pgs.

"2012 Edge—Trailer Towing Selector", Brochure, Preliminary 2012 RV & Trailer Towing Guide Information, 2011, 3 pgs.

"Ford Super Duty: Truck Technologies", Brochure, Sep. 2011, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 1 pg.

Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012, 2 pgs.

"Optionally Unmanned Ground Systems for any Steering-Wheel Based Vehicle" Universal. Unmanned., Kairos Autonomi, website: http://www.kairosautonomi.com/pronto4_system.html, retrieved Sep. 26, 2014, 2 pgs.

Micah Steele, R. Brent Gillespie, "Shared Control Between Human and Machine: Using a Haptic Steering Wheel to Aid in Land Vehicle Guidance", University of Michigan, Date Unknown, 5 pgs.

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

Sh. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

* cited by examiner

SPEED OPTIMIZED TRAJECTORY CONTROL FOR MOTOR VEHICLES

CROSS-REFERENCE TO RELATED APPLICATIONS

This application is a divisional of U.S. patent application Ser. No. 14/618,368, filed Feb. 10, 2015, now U.S. Pat. No. 10,286,950, which issued on May 14, 2019, entitled "SPEED OPTIMIZED TRAJECTORY CONTROL FOR MOTOR VEHICLES," the entire disclosure of which is hereby incorporated herein by reference.

This patent application is related to U.S. Pat. No. 9,493,187, which was issued on Nov. 15, 2016, entitled "CONTROL FOR TRAILER BACKUP ASSIST SYSTEM" which is a continuation-in-part of U.S. Pat. No. 9,374,562, which issued on Jun. 21, 2016, entitled "SYSTEM AND METHOD FOR CALCULATING A HORIZONTAL CAMERA TO TARGET DISTANCE," which is a continuation-in-part of U.S. Pat. No. 9,513,103, which issued on Dec. 6, 2016, entitled "HITCH ANGLE SENSOR ASSEMBLY," which is a continuation-in-part of U.S. Pat. No. 9,290,202, which issued on Mar. 22, 2016, entitled "SYSTEM AND METHOD OF CALIBRATING A TRAILER BACKUP ASSIST SYSTEM," which is a continuation-in-part of U.S. patent application Ser. No. 14/188,213, which was filed on Feb. 24, 2014, entitled "SENSOR SYSTEM AND METHOD FOR MONITORING TRAILER HITCH ANGLE," which is a continuation-in-part of U.S. patent application Ser. No. 13/847,508, which was filed on Mar. 20, 2013, entitled "HITCH ANGLE ESTIMATION." U.S. patent application Ser. No. 14/188,213 is also a continuation-in-part of co-pending U.S. Pat. No. 9,346,396, which was issued on May 24, 2016, entitled "SUPPLEMENTAL VEHICLE LIGHTING SYSTEM FOR VISION BASED TARGET DETECTION," which is a continuation-in-part of U.S. Pat. No. 9,102,271, which was issued on Aug. 11, 2015, entitled "TRAILER MONITORING SYSTEM AND METHOD," which is a continuation-in-part of U.S. Pat. No. 9,248,858, which was issued on Feb. 2, 2016, entitled "TRAILER BACKUP ASSIST SYSTEM," which is a continuation-in-part of U.S. Pat. No. 8,825,328 which was issued on Sep. 2, 2014, entitled "DETECTION OF AND COUNTERMEASURES FOR JACKKNIFE ENABLING CONDITIONS DURING TRAILER BACKUP ASSIST," which is a continuation-in-part of U.S. Pat. No. 8,909,426, which was issued on Dec. 9, 2014, entitled "TRAILER PATH CURVATURE CONTROL FOR TRAILER BACKUP ASSIST," which claims benefit from U.S. Provisional Patent Application No. 61/477,132, which was filed on Apr. 19, 2011, entitled "TRAILER BACKUP ASSIST CURVATURE CONTROL." The aforementioned related applications are hereby incorporated by reference in their entirety. The above-identified patents and patent applications may be collectively referred to herein as "The Related Patents and Patent Applications."

FIELD OF THE INVENTION

The present invention generally relates to systems for controlling/assisting vehicles during backup operations, and in particular to a system that controls vehicle speed during parking or trailer backup operations.

BACKGROUND OF THE INVENTION

Backing up a vehicle with a trailer can be a difficult task. In conventional motor vehicles, the operator must control the steering and vehicle speed while the vehicle is moving in reverse. Trailer backup assist systems have been developed to assist operators when backing up a vehicle having a trailer attached thereto.

Motor vehicles may also include active park assist systems that assist a driver during vehicle parking operations. Such systems may be configured to provide automated parking. During parking operations, the vehicle may be moved in a reverse direction.

The path that a vehicle is capable of following in reverse is limited by the design of the vehicle and trailer (if present), and road conditions. Furthermore, the path that a vehicle (and trailer) is capable of in a reverse direction may be more limited at higher vehicle speeds.

SUMMARY OF THE INVENTION

One aspect of the present invention is a trailer backup assist system for motor vehicles. The trailer backup assist system includes an auxiliary user input feature that can be used by a vehicle operator to provide a steering curvature command corresponding to a desired vehicle path curvature without requiring a user to move a steering wheel of the motor vehicle. The trailer backup assist system is configured to control a vehicle speed while the vehicle is backing up with a trailer attached thereto utilizing an input comprising at least one of a steering curvature command and an angle of a trailer relative to the vehicle. The trailer backup assist system generates a command to control at least one of a brake system, an engine torque, and a transmission gear selection to thereby control vehicle speed in a reverse direction based, at least in part, on the steering curvature command and/or the angle of a trailer relative to the vehicle.

Another aspect of the present invention is a method of controlling a speed of a motor vehicle in a reverse direction when a trailer is connected to the motor vehicle. The method includes utilizing at least one of a trailer angle and a steering curvature command from an auxiliary user input feature positioned in a vehicle interior as a control input. The method further includes controlling vehicle speed in a reverse direction based at least in part on the control input.

Another aspect of the present invention is a method of controlling a speed of a motor vehicle when the motor vehicle is traveling in a reverse direction. The method includes determining a desired vehicle path in a reverse direction based at least in part on a steering command. The method also includes determining an acceptable error criteria relative to the desired vehicle path. A speed of the vehicle is limited by controlling at least one of a vehicle brake, an engine torque, and an automatic gear selection such that the vehicle is capable of moving in a reverse direction along the desired vehicle path within the acceptable error criteria.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figures 3, 4:
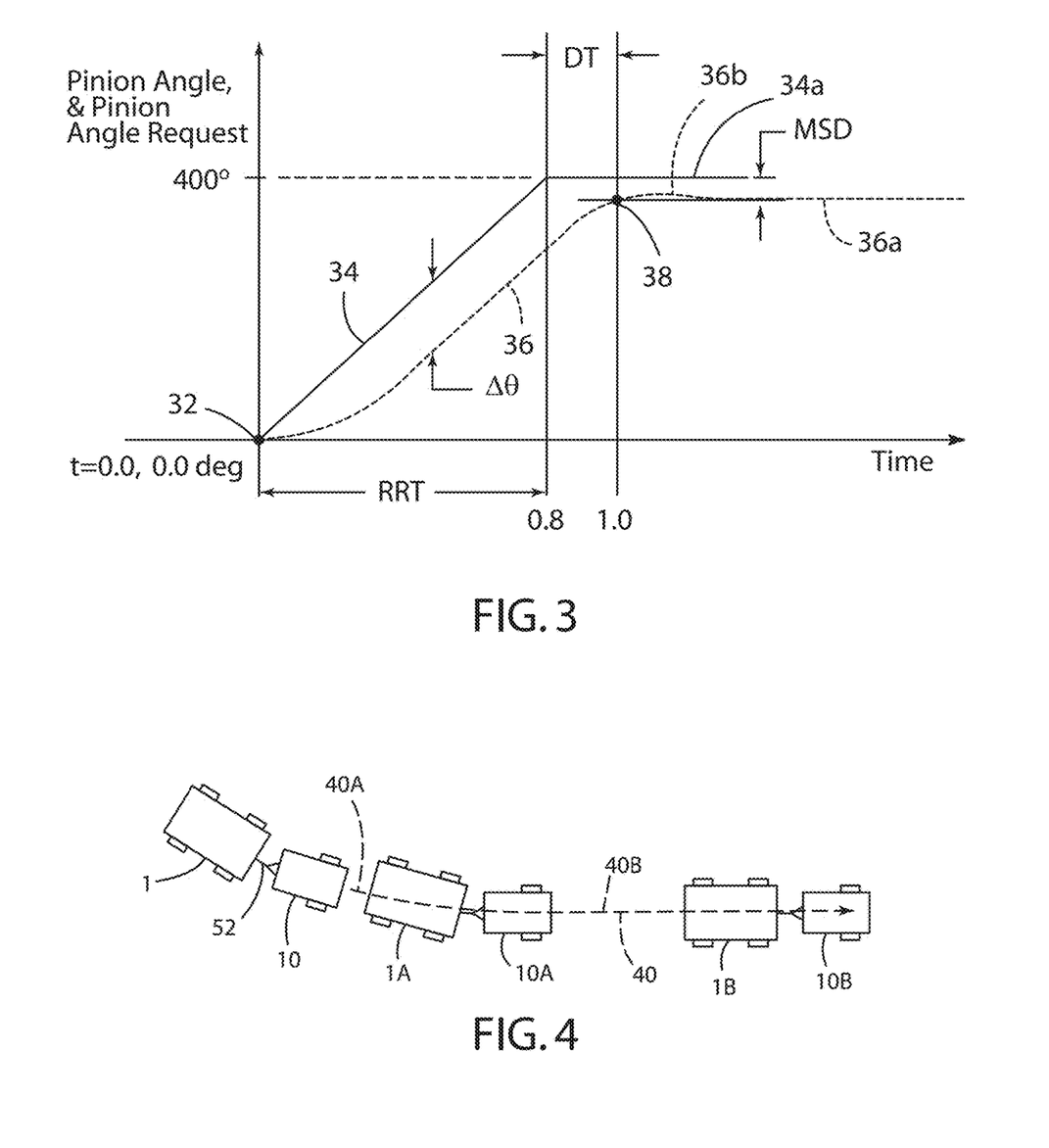
FIG. 3 is a graph showing a steering angle as a function of time.
FIG. 4 is a schematic plan view of a motor vehicle and a trailer at various positions along a vehicle path.

For purposes of description herein, the terms "upper," "lower," "right," "left," "rear," "front," "vertical," "horizontal," and derivatives thereof shall relate to the invention as oriented in FIG. 4. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
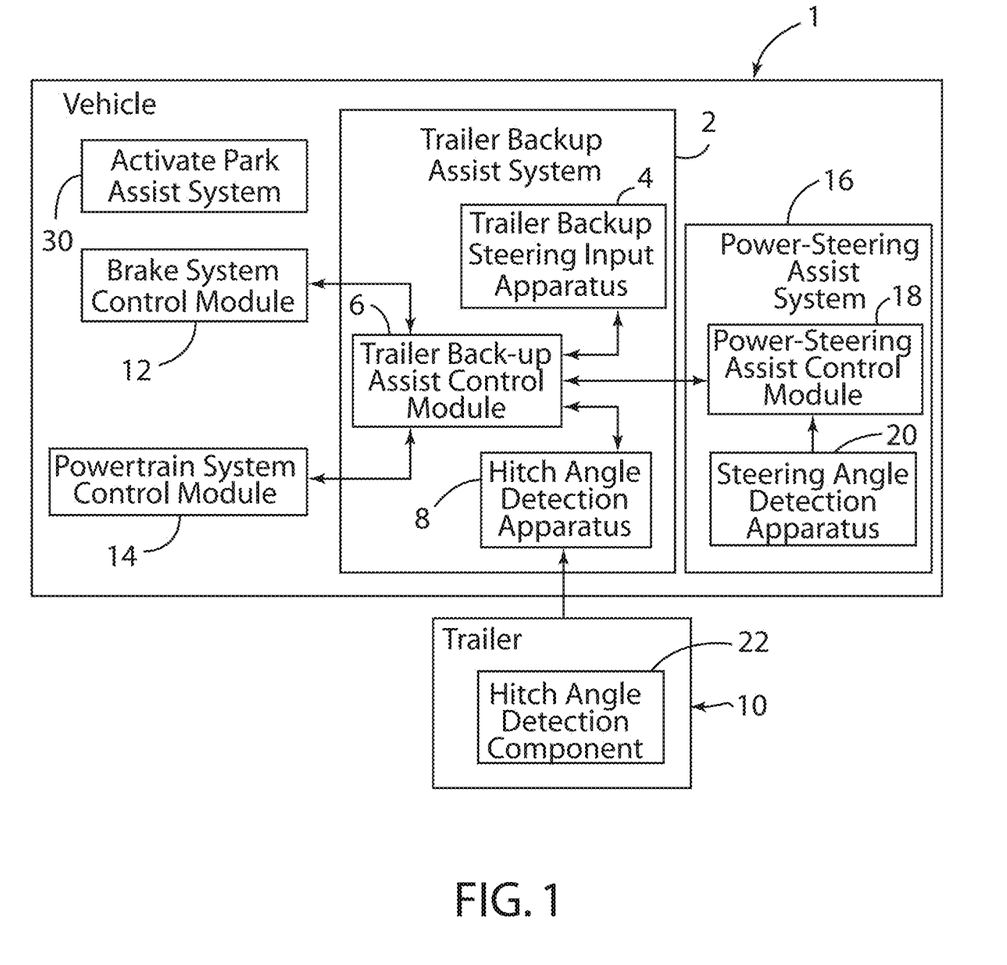
FIG. 1 is a schematic view of a motor vehicle including a trailer backup assist system according to one aspect of the present invention.

With reference to FIG. 1, a motor vehicle 1 according to one aspect of the present invention includes a trailer backup assist system 2 that can be utilized by a vehicle operator to assist the operator when the motor vehicle 1 is backing up with a trailer 10 attached thereto. The trailer backup assist system 2 includes a trailer backup steering input apparatus 4 that is operably connected to a trailer back-up assist control module 6. The trailer backup assist system 2 further includes a hitch angle detection apparatus 8 that is operably connected to the trailer back-up assist control module 6.

The trailer back-up assist control module 6 is operably connected to a brake system control module 12 and a power system control module 14. The vehicle 1 also includes a power steering assist system 16 including a power steering assist control module 18 and a steering angle detection apparatus 20. The power steering assist control module 18 is operably connected to the trailer backup assist control module 6. Trailer 10 may include a hitch angle detection component 22 that is operably connected to the hitch angle detection apparatus 8 of vehicle 1. Hitch angle detection component 22 is configured to measure the angle of trailer 10 relative to vehicle 1 about a vertical axis. A trailer angle of zero generally corresponds to an operating condition wherein the trailer 10 is aligned with vehicle 1 such that the vehicle 1 and trailer 10 move along a straight path. Hitch angle detection component 22 may also be configured to measure an orientation of trailer 10 relative to vehicle 1 about a first horizontal axis that extends side-to-side, and a second horizontal axis that extends in a vehicle fore-aft direction. This enables the trailer backup assist system 2 to determine if trailer 10 has begun to move up a slope and/or if trailer 10 has twisted relative to vehicle 1 due to moving onto a surface that is sloped to the side. It will be understood that various hitch angle detection/measuring devices may be utilized, and the components may be mounted on vehicle 1, on trailer 10, or on both. The vehicle 1, trailer backup assist system 2, trailer 10, and related components of FIG. 1 are described in detail in The Related Patents and Patent Applications, such that these components will not be described in detail herein.

Vehicle 1 may also include an active park assist system 30 to provide automated or assisted vehicle parking. The active park assist system 30 may be operably connected to one or more of the trailer backup assist system 2, trailer backup steering input apparatus 4, trailer backup assist control module 6, hitch angle detection apparatus 8, trailer 10, brake system control module 12, power train system control module 14 and power steering assist system 16, power steering assist control module 18, and steering angle detection apparatus 20. As discussed in more detail below in connection with FIG. 4, the active park assist system 30 may be utilized by a vehicle operator during vehicle parking operations either with or without a trailer 10 being connected to vehicle 1.

Figure 2:
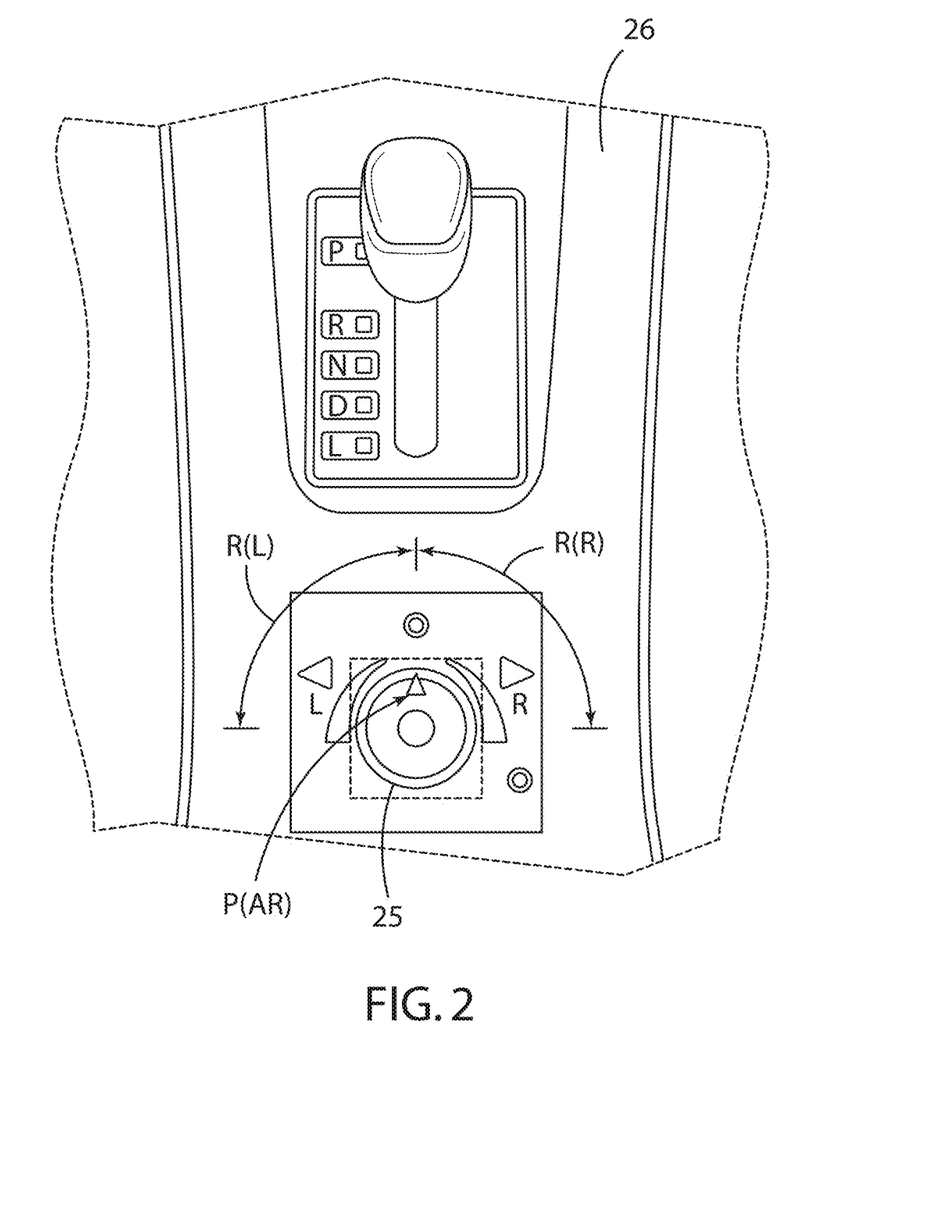
FIG. 2 is a fragmentary view of a portion of a vehicle interior including an auxiliary steering input that can be utilized by a vehicle operator when the vehicle is backing up with a trailer attached thereto.

With further reference to FIG. 2, an auxiliary user input such as a rotatable knob 25 may be mounted to a vehicle interior component such as a center console 26. Upon activation of the trailer backup assist system 2, a user can rotate knob 25 to provide a user steering request to the power steering assist system 16. During vehicle backup operations, a user can utilize the knob 25 to provide steering input rather than rotating the vehicle steering wheel. More specifically, the angular position of the rotatable knob 25 may correlate to a desired curvature, such that rotation of the knob 25 to a different angular position provides a different desired curvature with an incremental change based on the amount of rotation. As discussed in more detail below, the trailer backup assist system 2 and/or the active park assist system may be configured to generate steering command signals to change the wheel angle of the steered wheels. The steering command signals may be directly proportional to the user steering request, or the system may override or modify the steering request to generate steering command signals. The rotatable knob 25 may be biased (e.g., by a spring return) to a center or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 25, a force that biases the knob toward the at-rest position P(AR) can increase (e.g., non-linearly) as a function of the amount of rotation of the rotatable knob 25 with respect to the at-rest position P(AR). Additionally, the rotatable knob 25 can be configured with position indicating detents such that the driver can positively feel the at-rest position P(AR) and feel the ends of the opposing rotational ranges of motion R(L), R(R) approaching (e.g., soft end stops). The auxiliary user input knob 25 and operation thereof is described in detail in, for example, U.S. Pat. No. 9,504,434, such that a detailed description of this aspect of the trailer backup assist system 2 is not included herein.

With further reference to FIG. 3, a steering angle ("pinion angle") versus time for a motor vehicle 1 may include a lag between a controller steering request/command (line 34) and the actual or "absolute" steering angle (line 36). Specifically, if a steering request or command is generated at a time t=0.0 as designated 32 in FIG. 3, a pinion angle command (line 34) is input into the power steering assist system 16. However, due to the time lag in the system, the absolute steering angle follows the dashed line designated 36 in FIG. 3. This results in a deviation angle $\Delta\theta$ whereby the absolute pinion angle 36 is less than the command 34. In the illustrated example, the Request Ramp Time (RRT) is 0.8 seconds. After 0.8 seconds, the pinion angle request line 34 transitions to a horizontal line segment 34a. After 1.0 seconds the absolute steering angle 36 reaches a transition point 38, and transitions to a horizontal line segment 36a. This defines a maximum delay "DT" of 0.2 seconds. In the illustrated example, the horizontal line segment 36a is spaced below line segment 34a to define a maximum static deviation ("MSD") of about 2.0°. The upwardly curved line segment 36b represents an "overshoot" of the absolute steering angle 36 that may be as great as 2.0° relative to the horizontal static steering angle 36a. In the illustrated example, the pinion angle request 34a corresponds to a pinion angle of 400°. The angle of the steered wheels (typically the front wheels) of a vehicle relative to the pinion angle of FIG. 3 varies depending on the gear ratios in the steering system, and the relationship between the pinion angle and the wheel angle may be nonlinear. In the illustrated example, the pinion angle 400° corresponds to a wheel angle of about 22°. It will be understood that FIG. 3 illustrates a typical steering response. However, the actual dynamic and static variations of the steering angle relative to a steering command angle will vary from vehicle-to-vehicle. As discussed in more detail below, the trailer backup assist system 2 (FIG. 1) and/or the active park assist system 30 may be configured to take into account the steering angle time lag and steering angle variations illustrated in FIG. 3 to determine steering angle commands based on steering wheel angle requests and vehicle operating parameters.

With further reference to FIG. 4, a vehicle 1 and trailer 10 move along a path 40 as they back up. The path 40 may include a portion 40A having a smaller radius, and a portion 40B that is substantially straight, or has a very large radius. The trailer angle is zero when path 40 is straight, and increases as the radius of the path portion 40A decreases. Thus, the trailer angle between vehicle 1 and trailer 10 will be greater in the path portions 40A than the relatively straight path portions 40B. The trailer backup assist system 2 may be configured to limit the speed of vehicle 1 and trailer 10 during backup to a maximum speed. For example, when the operator actuates the trailer backup assist system and utilizes the auxiliary user input knob 25 (FIG. 2), the trailer backup assist system 2 may limit the speed of vehicle 1 to 10 mph, even when the trailer angle is zero degrees and the vehicle 1 and trailer 10 are moving along a straight portion 40B of path 40. However, according to one aspect of the present invention, if the vehicle 1 and trailer 10 are following a portion 40A of path 40 having a relatively small radius of curvature, the speed of the vehicle 10 may be limited by the trailer backup assist system 2 to a speed that is less than 10 mph to ensure that control is maintained and to avoid jackknifing.

Figure 5:
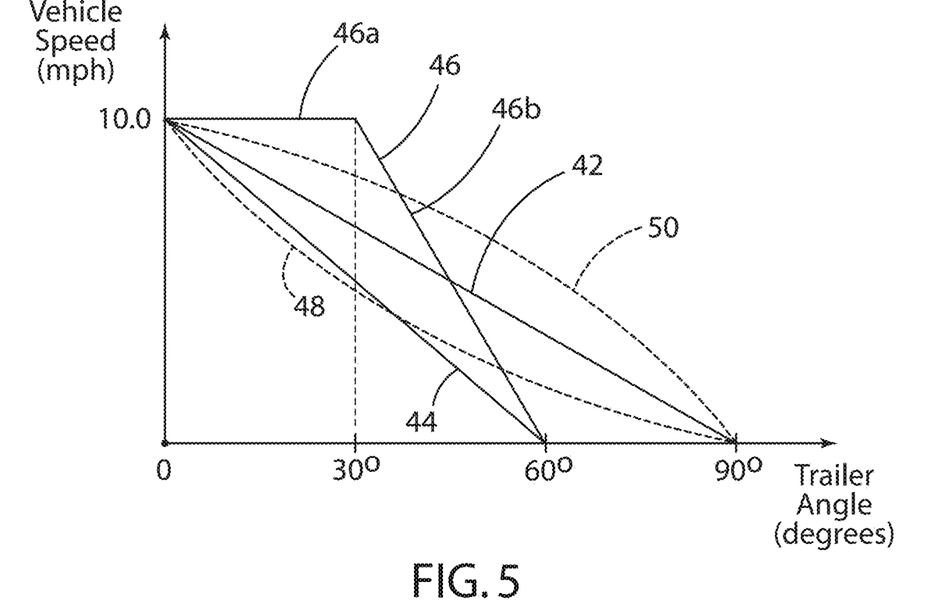
FIG. 5 is a graph showing maximum allowable vehicle speed versus trailer angle.

The trailer backup assist system 2 may be configured to limit vehicle speeds in reverse when a trailer 10 is attached to vehicle 1 to ensure that vehicle 1 can be controlled and to prevent jackknifing or other problematic operating conditions. FIG. 5 illustrates various ways to map maximum allowable vehicle speed as a function of trailer angle. In use, the trailer angle can be measured while the vehicle 1 is backing up, and the trailer backup assist system 2 limits the vehicle speed using, for example, the vehicle brakes or drivetrain such that the vehicle 1 does not exceed the maximum allowable speed even if a vehicle operator attempts to back up at a higher speed by depressing the accelerator pedal. With further reference to FIG. 5, line 42 represents a maximum allowable vehicle speed at different trailer angles. In the illustrated example, the line 42 is a straight line, and the maximum vehicle speed at a trailer angle of 0° is 10 mph, and the maximum allowable vehicle speed is reduced to 0 at a trailer angle of 90°. It will be understood that the maximum vehicle speed may be reduced to 0 at a lower trailer angle (e.g. 60°) as shown by the line 44. Also, as shown by the line 46, the maximum vehicle speed may not be limited to speed that is below 10 mph until a trailer angle of significantly greater than 0° (e.g. 30°) is reached, and the maximum vehicle speed may then be limited by a straight line that goes to 0 at a predefined trailer angle (e.g. 60°). In FIG. 5, the line 46 includes a segment 46a that is horizontal until the trailer angle reaches 30°, and the maximum allowable vehicle speed then transitions linearly to 0 as shown by the line segment 46b. The maximum allowable vehicle speed as a function of the trailer angle may also be non-linear (e.g. parabolic) as shown by the dashed lines 44 and 50.

The maximum allowable vehicle speed for a given trailer angle may be determined empirically to provide a plurality of pairs of data points, and the data may be interpolated utilizing a curve fit to thereby generate a line representing the maximum allowable vehicle speed as a function of the trailer angle. Alternatively, the maximum allowable vehicle speed as a function of a trailer angle may be modeled utilizing a straight (linear) line of the form $y=mx+b$, or a curved (nonlinear) line of the form $y=mx^2+cx+b$, or other suitable equation.

The trailer backup assist system 2 and/or active park assist system 30 may also take into account other variables to determine the maximum allowable vehicle speed for a given operating condition. For example, the curves illustrated in FIG. 5 may be modified to account for hill angles. Specifically, if the vehicle 1 and trailer 10 are backing up a hill, the maximum allowable vehicle speed may be reduced for a given (measured) trailer angle. The hill angle may be measured utilizing a gravity sensor on board vehicle 1, or it may be measured utilizing a sensor in hitch 52 (FIG. 4) interconnecting vehicle 1 and trailer 10. Additional variables such as road conditions may also be utilized to adjust the maximum allowable vehicle speed at a given trailer angle. For example, the vehicle 1 may include sensors that enable the trailer backup assist system to determine if the vehicle is on loose gravel, wet pavement, or other surface having reduced traction. If the vehicle 1 and/or trailer 10 are on a gravel or wet surface, the maximum allowable vehicle speed for a given trailer angle may be further reduced to ensure that the operator can maintain control of the trailer 10 during the backup operations.

Also, the hill angle may be determined utilizing topographical information that may be stored by the trailer backup assist system 2 or obtained utilizing a GPS system. Vehicle 1 may include an electronic compass or other device whereby the location and orientation of vehicle 1 on a topographical map may be determined, such that the hill angle of the vehicle 1 and trailer 10 can be determined.

Also, road condition data can be obtained from a remote source, and the maximum allowable vehicle speed can be adjusted if required. For example, if weather data in the vicinity of vehicle 1 indicates that it is raining or snowing, the maximum allowable vehicle speed for a given (measured) trailer angle may be reduced to account for the decrease in traction. Similarly, map data concerning the road surface (e.g. gravel or paved road) may be utilized to adjust the maximum allowable vehicle speed as a function of trailer angle.

In operation, a user actuates the trailer backup assist system 2, and begins to back up the vehicle 1 and trailer 10. The user utilizes the auxiliary user input knob 25 to provide steering requests to the trailer backup assist system 2. The trailer backup assist system 2 utilizes vehicle speed and trailer angle data to determine a maximum allowable vehicle speed, taking into account road conditions and the like as discussed above.

In general, the trailer backup assist system 2 can ensure that the vehicle 1 and trailer 10 do not exceed the maximum vehicle speed versus trailer angle criteria of FIG. 5 by limiting the speed of the vehicle, limiting the trailer angle, or both. Limiting the vehicle speed can be accomplished by sending a command to the brake system control module 12 and/or the power train system control module 14. The brake system control module 12 can be utilized to apply the brakes of the vehicle and/or the brakes of a trailer 10 if the trailer 10 is equipped with brakes. Also, the power train control module 14 can be utilized to limit the amount of torque generated by the vehicle's engine and/or by down shifting the engine transmission to utilize engine braking if the vehicle 1 has an internal combustion engine. If the vehicle 1 has an electric motor, the powertrain system control module may utilize the electric motor to provide braking. The trailer backup assist system 2 may also be configured to increase the vehicle speed if the vehicle speed and trailer angle are within the allowable limits.

The trailer backup assist system 2 may also be configured to control the angle of the steering wheels to ensure that the vehicle speed versus trailer angle (FIG. 5) does not exceed the allowable limits. In this case, the trailer backup assist system 2 will limit the angle of the steered wheels to a level that is lower than the input request by the user utilizing the knob 25 (FIG. 2) to prevent the trailer angle from exceeding the allowable limits for a given vehicle speed. Thus, the trailer backup assist system 2 may "override" a user steering request and generate a steering command that comprises a reduced steering angle relative to the user steering request. For example, if the vehicle 1 is traveling in reverse at 10 mph, and an operator rapidly rotates the knob 25, the trailer backup assist system 2 may apply the brakes to slow the vehicle, but the capability of the system may not allow the speed of the vehicle to be reduced quickly enough to permit the vehicle to follow the steering input by the user. In this case, the trailer backup assist system 2 may generate a steering command to the power steering system that is reduced to avoid unacceptable operating conditions (i.e. too tight of a turn for the vehicle speed). Also, if vehicle 1 is traveling at a very slow speed (e.g. 1.0 mph), the trailer angle is still limited due to the physical constraints of the interface between the vehicle 1 and trailer 10. Thus, the trailer backup assist system 2 may be configured to modify user steering requests and to limit the commands to the power steering system to a maximum value that may be less than an input request by a user utilizing the knob 25.

Furthermore, trailer backup assist system 2 may be configured to prioritize the user-requested steering input from knob 25 over the vehicle speed when determining whether to limit the vehicle speed or limit the turn angle to avoid the maximum allowable values as shown in FIG. 5. In general, the input provided by a user to the knob 25 corresponds to a desired vehicle path (e.g. vehicle path 40; FIG. 4), and the trailer backup assist system 2 may be configured to assume that the desired path is more important than the desired speed. Thus, the trailer backup assist system 2 may be configured to first adjust the vehicle speed to stay within the maximum allowable vehicle speed shown in FIG. 5, followed by (in terms of priority) limiting the steering angle if required to stay within the allowable limits shown in FIG. 5.

Also, as discussed above in connection with FIG. 3, the actual steering angle may lag the steering angle request, and the final (static) steering angle may be somewhat less than the steering request. The trailer backup assist system 2 may be configured to optimize the vehicle speed in reverse to follow the desired path 40 (FIG. 4) within an acceptable error. This allows the system to keep the steering speed within an optimum range to help keep the vehicle 1 on the desired path 40 with an acceptable amount of error. In general, the required speed of the steering system is a function of the vehicle speed and the lateral movement needed to follow the desired path 40. For example, the steering speeds required to follow a particular lateral change in path increase with vehicle speed. Likewise, the steering speeds required at a particular vehicle speed increase as the change in lateral movement increases.

Figure 6:
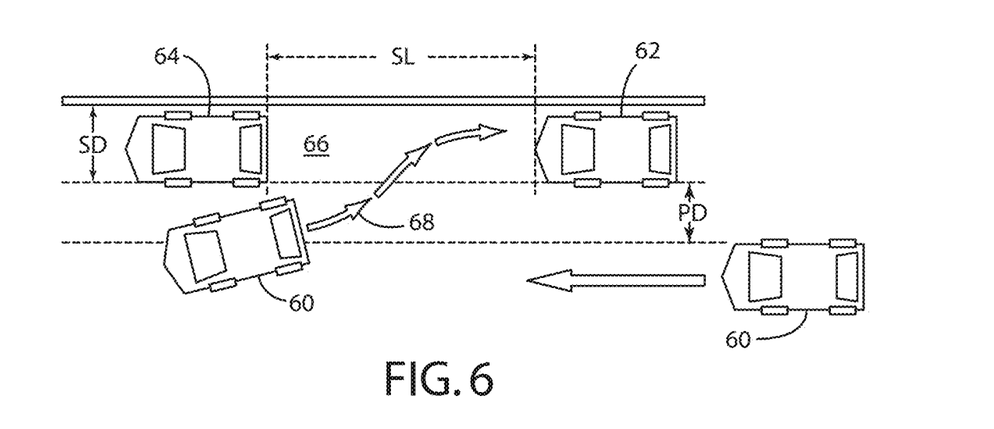
FIG. 6 is a partially schematic plan view showing a vehicle parking operation.

Vehicle speed may also be controlled during parking operations if the vehicle 1 is on a sloped surface. As shown in FIG. 6, a vehicle 60 (with no trailer attached) may be parked utilizing the active park assist system 30. In general, vehicle 60 is initially travelling adjacent parked cars 62 and 64, and the vehicle 60 is initially spaced apart from the parked cars 62 and 64 by a distance "PD." After the vehicle 60 passes a parking space 66 between parked vehicles 62 and 64, the active park assist system 30 is actuated by the operator, and the vehicle 60 travels in a reverse direction along a path shown by arrows 68. The parking space 66 is generally rectangular, and has a slot depth "SD" and a slot length "SL." The active park assist system 30 may be configured to limit vehicle speed based on road conditions (e.g. gravel) and/or the hill angle (e.g. topographical map data) that is encountered by vehicle 60.

The steering lag shown in FIG. 3 can be utilized by the trailer backup assist system 2 when a vehicle 1 is backing up with a trailer 10 (FIG. 4), and when a vehicle 60 without a trailer is being parked (FIG. 6). In either case, the trailer backup assist system 2 or the active park assist system 30 determine a desired vehicle path based on a user input utilizing knob 25 (FIG. 2) or based on a calculated path determined by active park assist system 30.

In general, the vehicle speed and steering can be controlled to optimize the vehicle path in any combination. For example, the power train system control module 14 (FIG. 1) may be controlled to control the torque output. The torque output can be monitored and modified to help maintain the optimum speed to support the capability of the steering system to position the vehicle on a desired path. The power train torque output may be limited to reduce the speed of the vehicle when needed by the steering system to keep the vehicle path error within a desirable range. Similarly, the brake torque generated may also be monitored and modified to help maintain the optimum speed to support the capability of the steering system to position the vehicle on a desired path. The brake system control module 12 may be actuated to reduce the speed of the vehicle when needed by the steering system to keep the path error within a desirable range. Furthermore, the automatic gear selection of the vehicle may be controlled, and the vehicle may down shift to facilitate engine braking and reduce the risk of overheating the braking system. Still further, if the vehicle is backing up with a trailer attached, and if the trailer has trailer brakes, the trailer brake torque may be monitored and modified to help maintain the optimum speed to support the capability of the steering system to position the vehicle on a desired path. The trailer brake torque may be applied to help reduce the speed of the vehicle when needed by the steering system to keep the path error within a desirable range.

In addition to the automated control discussed above, the vehicle may also include a warning system that alerts a user when the vehicle speed and/or steering angle are excessive, such that the desired path cannot be achieved by the vehicle. For example, the vehicle 1 may include a visual display (not shown), or the vehicle may be operably connected to an operator's smart device such as a cell phone or tablet. An illuminated camera display, heads up display, illuminated mirrors (text) or schematic screen displays may be used with a variety of color, intensity, and blank frequencies to provide feedback to the driver that a collision mitigation function is active and/or to help guide the driver to avoid the collision. The vehicle may also be configured to provide audible tones or voice commands utilizing speakers in the vehicle and/or a driver's smart device (e.g. cell phone) to instruct the driver how to avoid a collision, or to inform the driver that an automated collision mitigation function is active. Still further, a steering wheel torque and/or vibration may be utilized to help a driver avoid a collision or to inform the driver that an automated collision mitigation function is active. Other subsystems or devices such as phones, tablets, vibrating seats, or the like may also be used to warn a driver. The frequency of the vibration can be changed to convey additional information about the probability of the collision.

Numerous communication/warning arrangements may be utilized to convey information to the driver. Such devices may include, without limitation, the vehicle audio system, park aid speakers, text display, navigation system, reverse camera system, messaging seats, joystick, a steering wheel, mirrors, a mobile phone, a mobile computing device, and/or a mobile gaming device.

It will be understood that the vehicle may be configured to utilize the speed and trajectory control and/or warning features discussed above when the vehicle is traveling in a forward direction with or without a trailer, and when the vehicle is traveling in a reverse direction with or without a trailer.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A trailer backup assist system for motor vehicles, the trailer backup assist system comprising:
   an auxiliary input feature in a vehicle interior that can be used by a vehicle operator to provide a user steering curvature request while the vehicle is backing up with a trailer attached thereto corresponding to a desired vehicle path without requiring a user to move a steering wheel;
   wherein the trailer backup assist system is configured to control an angle of steered wheels and a vehicle speed while the vehicle is backing up with a trailer attached thereto utilizing inputs including a user speed request, a user steering curvature request from the auxiliary input feature while the vehicle is backing up with a trailer attached thereto, and a measured trailer angle comprising an angle of a trailer relative to the vehicle that is measured while the vehicle is backing up with a trailer attached thereto, and wherein the trailer backup assist system is configured to generate commands overriding user steering curvature requests and user speed requests, and wherein the trailer backup assist system is configured to generate a command to control at least one of a brake system, an engine torque, and a transmission gear selection to thereby limit vehicle speed in a reverse direction;
   wherein the trailer backup assist system is configured to utilize a predefined vehicle speed verses trailer angle relationship defining a plurality of non-equal maximum vehicle speeds as a function of trailer angle to limit vehicle speed in a reverse direction to a maximum vehicle speed determined from the predefined speed verses angle relationship based on the measured trailer angle, and to limit trailer angle to a maximum trailer angle determined from the predefined speed verses angle relationship; and
   wherein the trailer backup assist system is configured to prioritize user steering curvature requests over user speed requests.

2. The trailer backup assist system of claim 1, wherein: the brake system comprises a vehicle brake system.

3. The trailer backup assist system of claim 1, wherein: the trailer backup assist system limits vehicle speed in a reverse direction as a function of a steering curvature request by a user that is input while the vehicle is backing up with a trailer attached thereto.

4. The trailer backup assist system of claim 1, wherein: the trailer backup assist system is configured to override an operator steering curvature request if a reduction in vehicle speed due to overriding an operator speed request is insufficient to avoid exceeding a maximum trailer angle determined from the predefined speed verses angle relationship.

5. The trailer backup assist system of claim 4, wherein: the trailer backup assist system is configured to limit vehicle speed during backup to a predefined maximum speed when the measured trailer angle is zero.

6. The trailer backup assist system of claim 1, wherein: the maximum allowable speed varies linearly as a function of at least one of a trailer angle and a steering request of a user.

7. The trailer backup assist system of claim 1, including:
   a brake system control module;
   a powertrain system control module;
   a hitch angle detection apparatus; and
   wherein the trailer backup assist system is configured to obtain a trailer angle from the hitch angle detection apparatus while the vehicle is backing up with a trailer attached thereto and to generate a command to at least one of the brake system control module and the powertrain system control module to limit a maximum vehicle speed in a reverse direction while the vehicle is backing up with a trailer attached thereto.

8. The trailer backup assist system of claim 1, wherein: the auxiliary user input feature comprises a rotatable knob configured to be mounted in a vehicle interior.

9. A method of controlling a speed of a motor vehicle moving in a reverse direction when a trailer is connected to the motor vehicle, the method comprising;
   determining a maximum allowable vehicle speed in a reverse direction based, at least in part, on predefined criteria defining a plurality of non-equal predefined maximum vehicle speeds as a function of at least one of a trailer angle and a steering curvature command;
   utilizing control input comprising at least one of a measured trailer angle that is measured while the motor vehicle is moving in a reverse direction with a trailer attached thereto and a user steering request that is input from an auxiliary user input positioned in a vehicle interior while the motor vehicle is moving in a reverse direction with a trailer attached thereto; and
   controlling an angle of steered wheels of the vehicle and vehicle speed in a reverse direction based at least in part on the control input and the predefined criteria, wherein user steering curvature requests are prioritized over user speed requests.

10. The method of claim 9, including:

utilizing at least one of a vehicle brake system and a trailer brake system to limit vehicle speed in a reverse direction.

11. The method of claim 9, including:

controlling a vehicle transmission to limit vehicle speed.

12. The method of claim 9, including:

controlling at least one of a braking system, an engine torque, and a transmission gear selection to prevent the motor vehicle from exceeding the maximum allowable vehicle speed.

13. The method of claim 12, including:

measuring a trailer angle; and wherein:

the maximum allowable vehicle speed is a linear function of the trailer angle.

14. The method of claim 12, including:

overriding a user steering curvature request if reductions in speed due to overriding user speed requests are insufficient to avoid violating the predefined criteria.

\* \* \* \* \*